June 7, 1955

R. R. DONALDSON 2,710,015

PRESSURE DIFFERENTIAL RESPONSIVE DEVICES OF THE
HOLLOW RING TYPE, PROVIDED WITH MEANS FOR
CONVERTING RESPONSE INTO PRESSURE OUTPUTS

Filed May 2, 1951

INVENTOR.
ROBERT R. DONALDSON
BY
Zugelter & Zugelter
Attys.

INVENTOR.
ROBERT R. DONALDSON

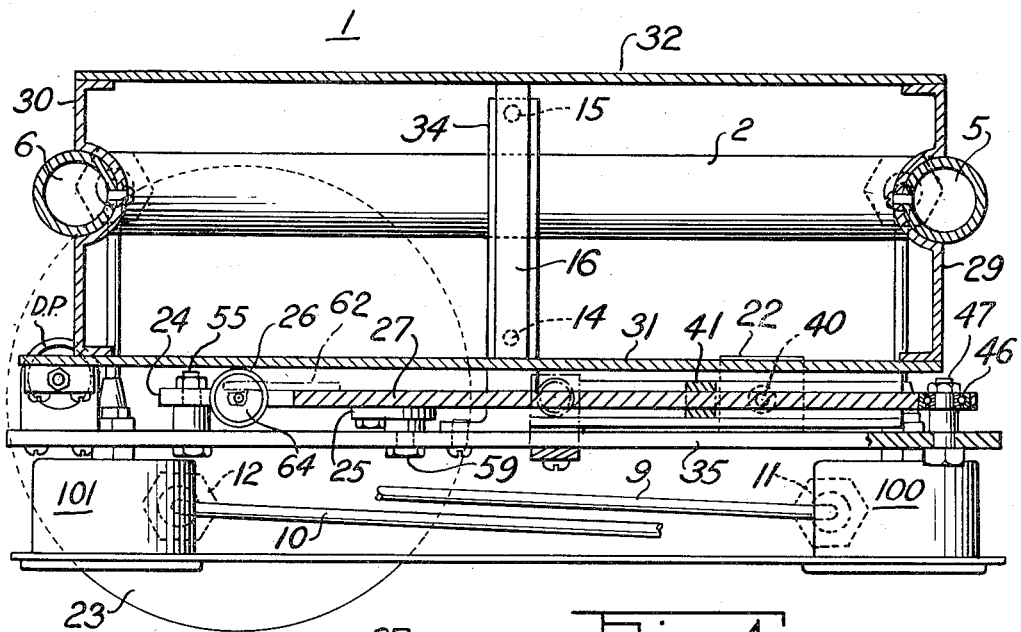
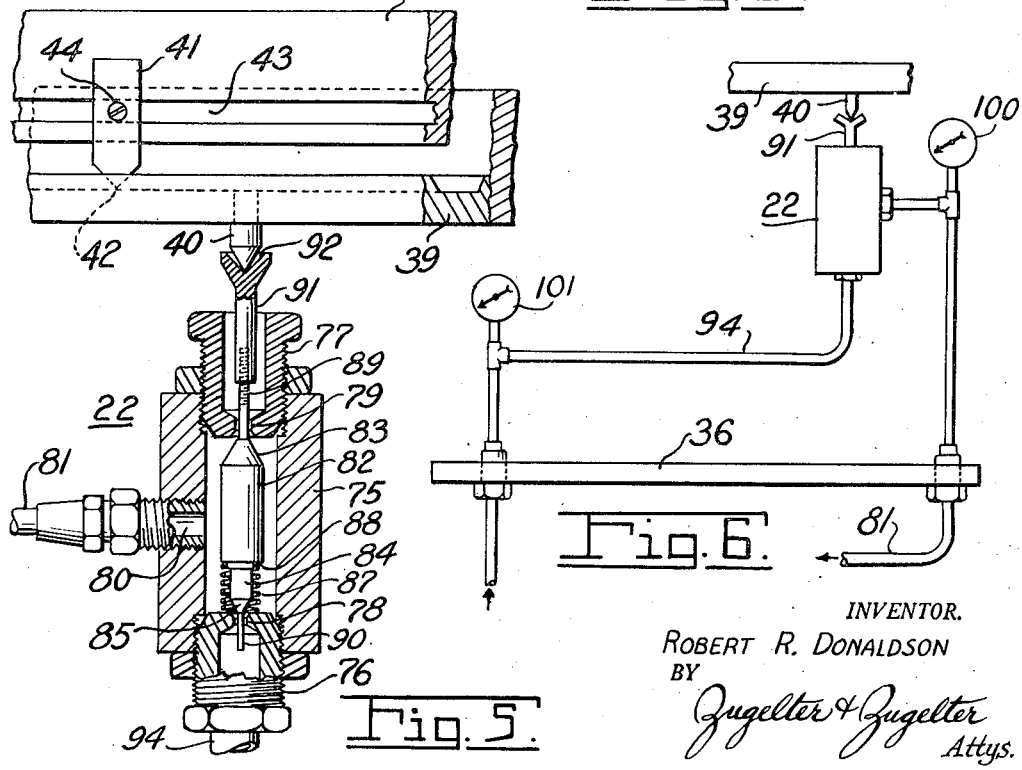

2,710,015

PRESSURE DIFFERENTIAL RESPONSIVE DEVICES OF THE HOLLOW RING TYPE, PROVIDED WITH MEANS FOR CONVERTING RESPONSE INTO PRESSURE OUTPUTS

Robert R. Donaldson, Forest Hills, Pa., assignor to Hagan Corporation, Pittsburgh, Pa., a corporation of Pennsylvania Application May 2, 1951, Serial No. 224,194

4 Claims. (Cl. 137—85)

This invention relates to pressure differential responsive devices of the hollow ring type containing a heavy liquid, such as mercury, for example, that is displaced in accordance with the pressure differential acting thereon. More particularly, the invention relates to a hollow ring pressure responsive device having means co-acting with the ring to develop an output pressure and a counter torque that balances the torque developed by the pressure differential and acting on the ring.

An object of this invention is to provide a flow responsive device embodying a hollow ring having a partition within the same and a quantity of heavy liquid which, with the partition, forms spaced pressure-receiving chambers, and mechanism co-acting with the ring for developing a pressure output and a counter torque on the ring that is sufficient in magnitude to balance the pressure differential torque. The mechanism by which the output pressure and the balancing counter torque are developed is so arranged that the sensitivity of the ring to pressure differentials is unimpaired.

A further object of the invention is to provide a flow-responsive device of the character set forth above, with a counter torque mechanism that may be so arranged that the output pressure will be proportional to $(P_1-P_2)^{1/n}$, where $n$ is a number whose value is greater than zero, and $P_1$ and $P_2$ are the pressures to which the ring responds.

Other objects of the invention will in part be apparent, and will in part be obvious, from the following description taken in conjunction with the accompanying drawings, in which:

Fig. 4 is a top plan view of the device shown in Fig. 1, partly in section, the section being on line IV—IV of Fig. 1;

Fig. 5 is an enlarged view in section of details embodied in the device; and

Fig. 6 is a schematic view of piping and gages embodied in the device.

Figure 1:
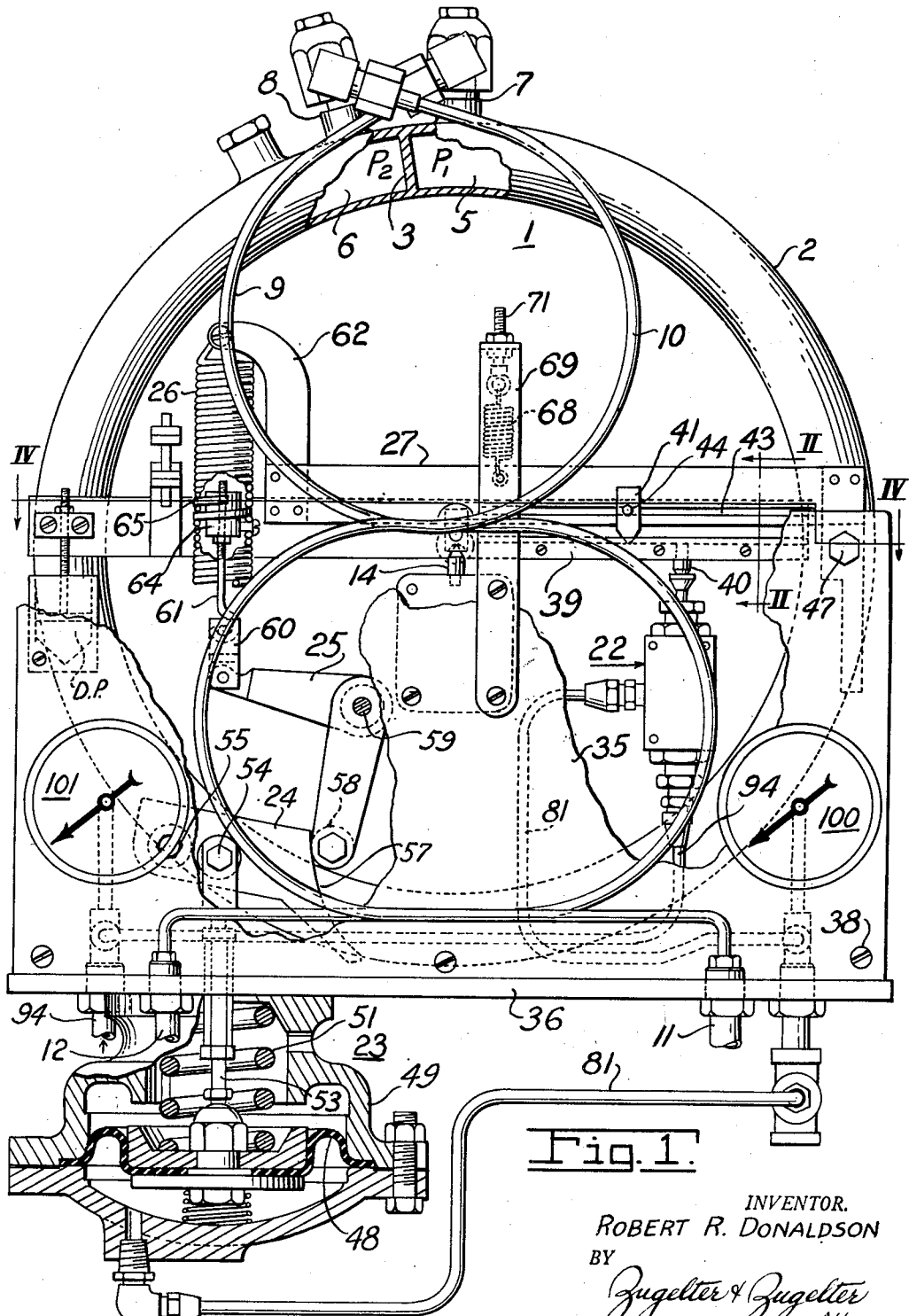
Figure 1 is a view in front elevation, partly in section, of a device arranged and constructed in accordance with an embodiment of the invention.
Figures 2, 3:
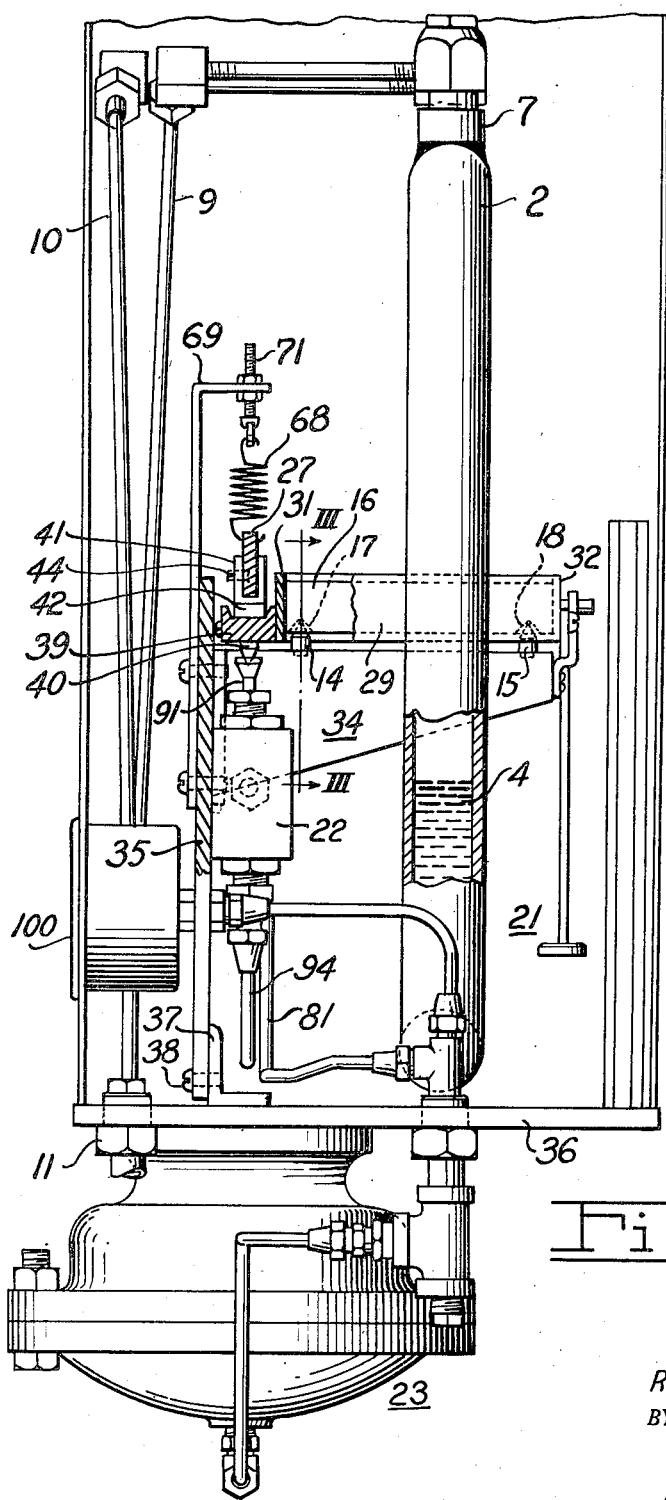
Fig. 2 is a view of the device in side elevation, and partly in section, taken on line II—II of Fig. 1.
Fig. 3 is an enlarged view in section taken on line III—III of Fig. 2.

In Figs. 1, 2, and 4 a pressure differential responsive device 1 embodying a form of the invention, is shown. It includes a hollow ring 2 having a partition 3 within the same, adjacent the top thereof. Within the ring is a quantity of heavy liquid 4, such as mercury, for example, which, with the partition divides the interior of the ring into pressure chambers 5 and 6. Pressures $P_1$ and $P_2$ whose differential is to be measured, may be introduced into chambers 5 and 6, respectively, through fittings 7 and 8. These fittings are connected by tubes 9 and 10 which are arranged to form a figure 8, as shown in Fig. 1, to fittings 12 and 11, respectively, through which the medium represented by pressures $P_1$ and $P_2$ may be admitted.

Ring 2 is mounted on a frictionless bearing located at the geometric center of the ring. This bearing may comprise hardened steel cones 14 and 15 and a bar 16 secured to the ring, containing complementary inverted conical recesses 17 and 18.

The ring is biased to zero position—a position corresponding to a zero difference between pressures $P_1$ and $P_2$ by means of a counter weight 21. When the pressure difference ($P_1$—$P_2$) increases from zero, a differential torque develops tending to turn the ring counter-clockwise, from the zero position of Fig. 1. This motion of the ring is utilized to actuate the escapement valve 22 which is designed to transmit pressures of increasing value, from say, zero gage, to a maximum value, as the ring turns. The output pressure of this valve is transmitted to a cam positioner comprising a pressure-actuated device 23 that acts through a cam lever 24, a cam follower lever 25, a spring 26, and a counter torque producing lever 27 that develops a counter torque on the ring. The counter torque increases in value until it balances the pressure differential torque, at which time the sending or output pressure of valve 22 comes to a steady value determined by the angular displacement of the ring from its zero position at the point of balance.

As shown in Figs. 1, 2 and 4, a frame is secured to ring 2 at a location corresponding to its horizontal diameter when in the zero position. The frame comprises end members 29 and 30 secured to the ring at diametrically opposite sides, and sides members 31 and 32 located at the front and rear, respectively, of the ring. The side members are secured to the end members, as shown. The bearing bar 16 is secured to the side members 31 and 32, as shown.

The cone bearing members 14 and 15 are carried by a bracket 34 secured to a vertical frame plate 35. Plate 35 is secured to the base 36 of the device by means of an angle 37 and screws 38.

A bearing bar 39, of substantially channel shape is secured to the front face of the side frame member 31. Bearing bar 39, as shown, extends from a point adjacent the rotational center of the ring to a point adjacent the right hand side of the ring, as seen in Fig. 1. To the underside of bar 39 is secured a cone point bearing 40 that has operative connection with the valve of valve 22.

The force developed by device 23 and acting through spring 26 is imposed on bar 39 through a bearing member 41 having a knife edge 42, that engages the bar 39, as shown more particularly in Figs. 1, 2 and 5. Bearing member 41 is bifurcated, as shown in Fig. 2, so that it can receive lever 27 edgewise between the bifurcations, and is slidable along lever 27. Thus the point at which member 41 bears on bar 39 may be adjusted with respect to the rotational center of ring 2. A groove 43 is formed in a face of lever 27 so that the bearing member 41 may be secured thereto at any desired position by means of a set screw 44.

Lever 27 is pivotally supported by a bearing 46 preferably an anti-friction bearing, on a stub shaft 47 secured to frame member 35. It is preferred that the center of rotation of the bearing 46 and the point of contact of the knife edge 42 with bar 39 lie in a common plane passing through the center of rotation of the ring, the center of rotation being on a line connecting the points of contact between members 14 and 15 and the bearing cups 17 and 18 in the bar 16.

If it is not necessary to conveniently adjust the point where the force of spring 26 is applied to the ring, the spring may be connected directly to the ring.

Device 23 comprises a flexible diaphragm 48 disposed in a housing 49 secured to the under side of base 36.

Pressure from valve 22 is admitted to the housing 49 of the under side of diaphragm 48. As the pressure increases from zero gage to the maximum output value, the diaphragm moves upwardly against a strong spring 51. The spring 51 is of such strength or calibration that it will be compressed a total of, say, 1 inch when the pressure increases from, say, zero gage to 60 pounds p. s. i.

The central portion of diaphragm 48 is connected by a push rod 53, and a pivot pin 54 to cam lever 24. Cam lever 24 is mounted on a pivot pin 55 secured to frame member 35. Thus, as the diaphragm moves upwardly, cam lever 24 is rotated counter-clockwise, and it will have a definite position for each value of pressure acting on diaphragm 48.

On one end of cam lever 24 is a cam surface 57. That surface engages a cam follower 58 such as a roller, carried by lever 25. The form of lever 25 is preferably that of a bell crank, as it makes for compactness in the arrangement and assembly of parts. Lever 25 is mounted on the pivot pin 59 at the knee thereof, the pin being secured to the vertical frame plate 35. Thus, as cam lever 24 turns counter-clockwise, the bell crank 25 rotates counter-clockwise.

One leg of bell crank 25 is connected by a link 60 and eye bolt 61 to one end of spring 26 which, as illustrated, is a tension spring. The opposite end of spring 26 is connected to a vertically extending bracket 62, the lower end of which is secured to lever 27. The bracket 62 is shaped like a goose neck so that the point of attachment of the spring to the bracket will be approximately in alignment with the vertical axis of the spring.

The number of active turns of spring 26 may be adjusted by means of a nut 64 having spaced circular flanges 65 thereon between which a turn or coil of the spring may be received. By turning the nut in one direction or the other the number of active turns of the spring may be increased or decreased.

In order to damp out vibrations that may arise and thereby avoid erratic output pressures from valve 22 a dash pot D. P. may be employed. The dash pot may comprise a stationary cup having a suitably viscous oil therein and a loosely fitting piston connected to the ring supporting frame 28—31.

In order that the dead weight of the parts which are operatively connected to ring 2 may not affect its sensitivity to the pressure difference ($P_1$—$P_2$), an adjustable support spring 68 and a support bracket 69 are provided. As shown in Figs. 1 and 2, the bracket 69 is secured to the frame plate 35, that one end of spring 68 is secured to lever 27 and the other end thereof is secured to eye bolt 71 which is threaded to the bracket. By adjusting the tension of spring 68, it will be seen that the dead weight of the lever 27, spring 26 and the parts connecting the spring to the bell crank 25, will be taken by spring 68. In practice, the tension of the spring 68 would be so adjusted that when the ring is in its zero position, knife edge 42 of bearing member 41 will just barely touch bar 39.

The details of construction of valve 22 are shown in Fig. 5. As illustrated, the valve comprises a hollow body 75 having bushings 76 and 77 threaded into the opposite ends thereof. The bushings are provided with ports 78 and 79, respectively, which constitute the inlet and exhaust ports of the valve. The body is also provided with an output or sending port 80, this port being connected by a pipe 81 to the diaphragm chamber of device 23. Within the valve chamber is a valve 82 having a tapered end 83 disposed to control the exhaust port 79 and a reduced end portion 84 having a tapered surface 85 that controls the inlet port 78. A coil spring 87 is disposed about the portion 84 and between a shoulder 88 on the valve and the adjacent end of bushing 76 and urges valve 82 towards the exhaust port seat 79.

The opposite ends of valve 82 are provided with stems 89 and 90, respectively, that extend through the exhaust port 79 and the inlet port 78, thereby guiding valve 82 in its movement to or from these ports. Stem 89 has a link 91 secured thereto having a tapered cup 92 in the upper end thereof which receives the cone point bearing member 40 secured to bar 39.

When valve 82 is in a position where the exhaust port seat 79 is completely closed, a position corresponding to the maximum value of ($P_1$—$P_2$), the pressure at the outlet port 80 is equal to the pressure of the supply source connected to the bushing 76. In practice, a supply of pressure medium such as compressed air, is connected to the bushing 76 by a pipe 94. The supply source, if compressed air, would be at constant pressure of any desired value, say, 60 pounds p. s. i.

When valve 82 is in a position to completely close inlet port 78, a position corresponding to the zero position of ring 2, as when ($P_1$—$P_2$) is equal to zero, for example, the pressure delivered at the outlet port 80 will be equal to atmospheric or zero gage, as any pressure medium within the valve body and pipe 81 will exhaust to the atmosphere through port 79. For any intermediate position of the valve 82, the pressure at the outlet port 80 will be proportional to the relative restrictions of the inlet and exhaust ports. In other words, the pressure at the outlet port 80 may vary by infinitesimal amounts from zero gage pressure to the value of the pressure of the supply source as supplied to the bushing 76.

The travel of valve 82 from one port to the other is very small, being of the order of several hundredths of an inch. Therefore, the angular displacement of ring 2 for full scale pressure differential range will be very small. For practical purposes, the motion of the ring and any incidental friction may be regarded as being nil.

The shape of the cam surface determines the relationship between the value of the output pressure O. P. of valve 22 and the flow through an orifice, of a liquid or fluid which is represented physically by the pressure drop ($P_1$—$P_2$) acting on the meter.

The pressure drop ($P_1$—$P_2$) which for convenience may be designated $\Delta P$, produces a ring torque which is balanced by a force that is proportional to the stretch of spring 26. The stretch of spring 26 is proportional to the resisting torque imposed on the ring. The resisting torque represented by the stretch of spring 26 is produced by the output pressure O. P. of valve 22 which acts on the spring 26 through the cam and lever system as described supra. If the output pressure O. P. is to be directly proportional to the flow, it must be proportional to $(P_1-P_2)^{1/2}$ or $\Delta P^{1/2}$. This relationship is accomplished mechanically by so shaping the surface of cam 57 that the stretch of spring 26 and consequently the value of the resisting torque is proportional to the square of the output pressure O. P.

When the cam surface 57 is so shaped, the relationships between $\Delta P$ or ($P_1$—$P_2$) and the output pressure O. P. may be shown as follows:

1. Flow is proportional to $(P_1-P_2)^{1/2}$ or $\Delta P^{1/2}$;
2. The resisting force acting to stretch spring 26 is proportional to $\Delta P$;
3. The stretch of spring 26 is proportional to $(O. P.)^2$;

From 2 and 3 above it follows that ($P_1$—$P_2$) or $\Delta P$ is proportional to $(O. P.)^2$.

4. $\Delta P^{1/2}$ is proportional to O. P.; and
5. Flow (which produces ($P_1$—$P_2$) or $\Delta P$) is proportional to O. P. from 1 and 4 above.

By properly shaping the curve of the surface 57, the output pressure at port 80 of valve 22 will be proportional to $(P_1-P_2)^{1/n}$. In the expression $(P_1-P_2)^{1/n}$ it is assumed that $n$ is greater than zero. If $n$ is unity it will be apparent that the output pressure of valve 22 will be proportional to ($P_1$—$P_2$), or, to the square of the flow through the orifice producing the pressure difference ($P_1$—$P_2$). When $n$ is equal to 2, the pressure output of valve 22 will be proportional to the square root of the pressure difference ($P_1$—$P_2$), and therefore linearly proportional to the rate of flow through the orifice. For other values of $n$ the pressure output of valve 22 will bear a relationship to ($P_1$—$P_2$) corresponding to the value of $n$ selected.

It is to be understood that the shape of the cam surface 57 in practice may be modified in accordance with the characteristics of the particular orifice to which the inlet pipes 11 and 12 are connected, so that the outlet pressure of valve 22 will accurately reflect the true rates of flow through the orifice.

The output pressure from valve 22 may be transmitted to regulating apparatus, to a recording mechanism of the device (not shown), or other devices and apparatus, as will be understood by those skilled in this art. The supply pressure to and output pressure from valve 22 may be shown by indicating gages 101 and 100, respectively. By properly calibrating gage 100, it will indicate ($P_1$—$P_2$)$^{1/n}$. By adjusting the position of bearing member 41 along lever 27, the range of the output pressure of valve 22 with reference to the range of values of ($P_1$—$P_2$) may be adjusted with respect to each other.

Device 1 as illustrated and described, utilizes the sensitivity and responsiveness of a ring balance—the pressure differential torque being proportional to the displacement of the heavy liquid 4— and the independent positive power of the cam positioning device 23 and the cam, bell crank, counter torque spring and counter torque lever connected thereto. These latter components, while they do not interfere with the substantially frictionless ring balance, convert the response of the ring balance into positive output pressures whose range may be very wide and materially greater in magnitude than the range and magnitude of the pressure differential ($P_1$—$P_2$). Furthermore, the mechanism which thus co-acts with the ring balance is so constructed that the relationship of the output pressure of valve 22 to the pressure differential ($P_1$—$P_2$) may be predetermined by so shaping the cam surface 57 that it corresponds to the desired relationship.

From the foregoing description, it will be appreciated by those skilled in this art, that various modifications and changes may be made in the illustrated embodiment of the invention without departing from either the spirit or the scope of the invention.

Therefore, what I claim as new and desire to secure by Letters Patent is:

1. Apparatus responsive to a pressure difference ($P_1$—$P_2$) that comprises a hollow ring having a quantity of heavy liquid therein, and a partition which, with the liquid, divides the interior of the ring into chambers for receiving said pressures $P_1$ and $P_2$, respectively, said ring being mounted at its center on a frictionless bearing, a bar extending across the ring in a plane containing the diameter thereof, an escapement valve disposed to be actuated by said bar in a direction to increase the output pressure of the valve from a minimum to a maximum value in increments proportional to the angular displacement of the ring, a pivoted cam lever, means for turning the cam lever in incremental steps through a predetermined angle in response to, and in accordance with, the output pressure of said valve, a pivotally-mounted cam follower lever actuated by said cam lever, a second lever having a pivotal support at one end and provided with a knife edge that bears on said bar, the points of engagement of said knife edge with said bar, and the point of operative engagement between said diameter bar and valve, and the pivot point of said second lever being in a common plane passing through the axis of rotation of the ring, and a spring connected to the cam follower lever and said second lever for exerting a restraining torque on the ring that balances the torque developed by the pressure difference ($P_1$—$P_2$) on the ring.

2. Apparatus responsive to a pressure difference ($P_1$—$P_2$), that comprises a hollow ring having a quantity of heavy liquid therein, and a partition which, with the liquid, divides the interior of the ring into chambers for receiving said pressures $P_1$ and $P_2$, respectively, said ring being mounted at its center on a frictionless bearing, a bar extending across the ring, an escapement valve disposed to be actuated by said bar in a direction to increase the output pressure of the valve from a minimum to a maximum value, in increments proportional to the angular displacement of the ring, a pivoted cam lever, means for turning the cam lever in incremental steps through a predetermined angle in response to, and in accordance with, the output pressure of said valve, a pivotally-mounted cam follower lever actuated by said cam lever, a second lever having a pivotal support disposed outwardly of the ring center and engaging said bar at a location between the ring center and said pivotal support, and a spring connected to the cam follower lever and to said second lever for exerting a restraining torque on the ring that balances the torque developed by the pressure difference ($P_1$—$P_2$) on the ring.

3. Apparatus according to claim 1, in which the second lever is provided with means for yieldingly supporting the weight thereof.

4. Apparatus according to claim 2, characterized by the fact that said second lever is provided with means for yieldingly supporting the weight thereof.

References Cited in the file of this patent

UNITED STATES PATENTS

| Number | Name | Date |
|---|---|---|
| 2,399,938 | Pett | May 7, 1946 |
| 2,408,685 | Rosenberger | Oct. 1, 1946 |
| 2,451,425 | Allwein | Oct. 12, 1948 |
| 2,461,026 | Bilyeu | Feb. 8, 1949 |
| 2,536,184 | Johnson | Jan. 2, 1951 |
| 2,585,705 | Vetter | Feb. 12, 1952 |